C. KRATT.
APPARATUS FOR HEATING WATER BY ELECTRICITY.
1,001,654.
Patented Aug. 29, 1911.
2 SHEETS—SHEET 1.
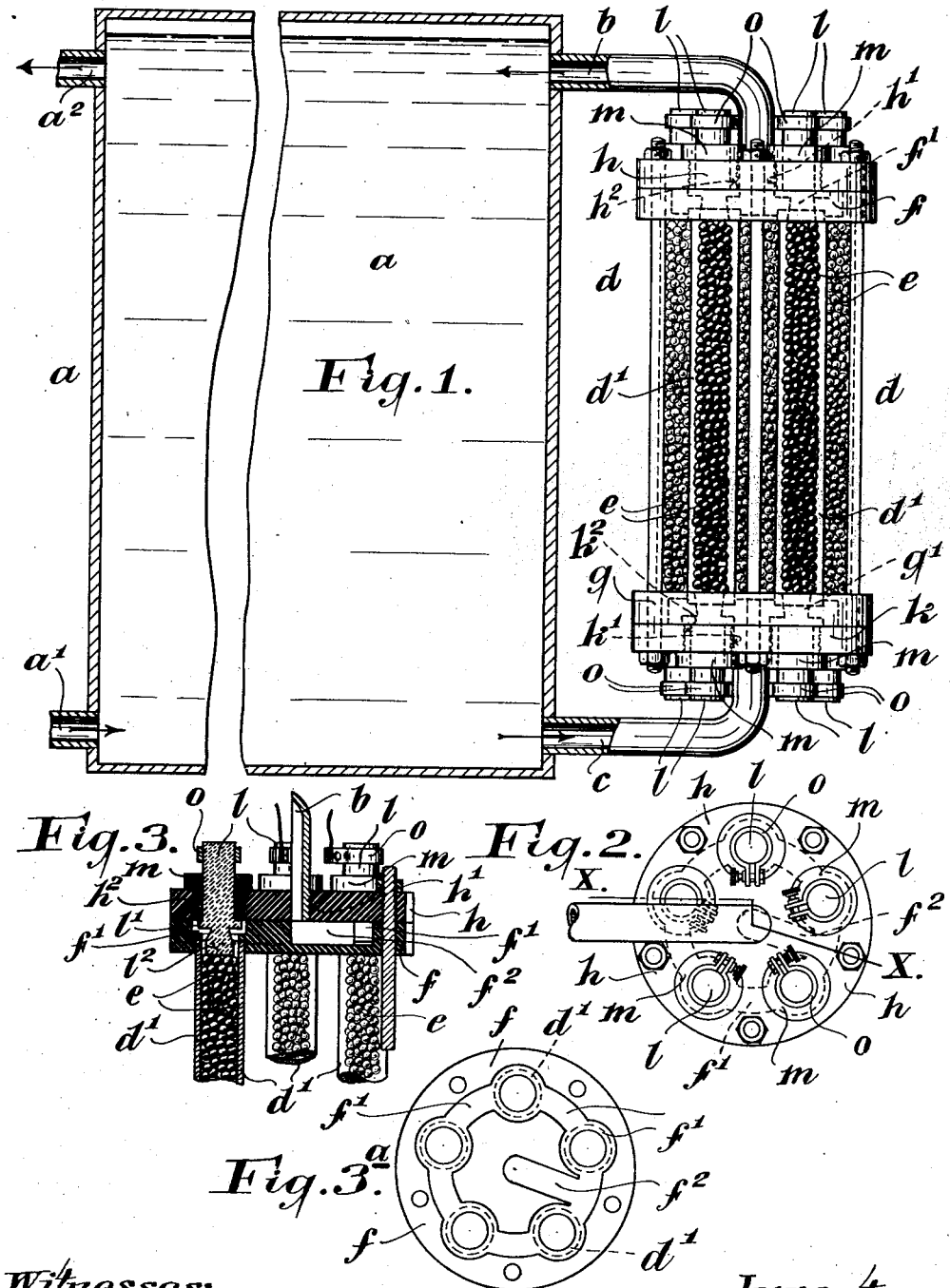

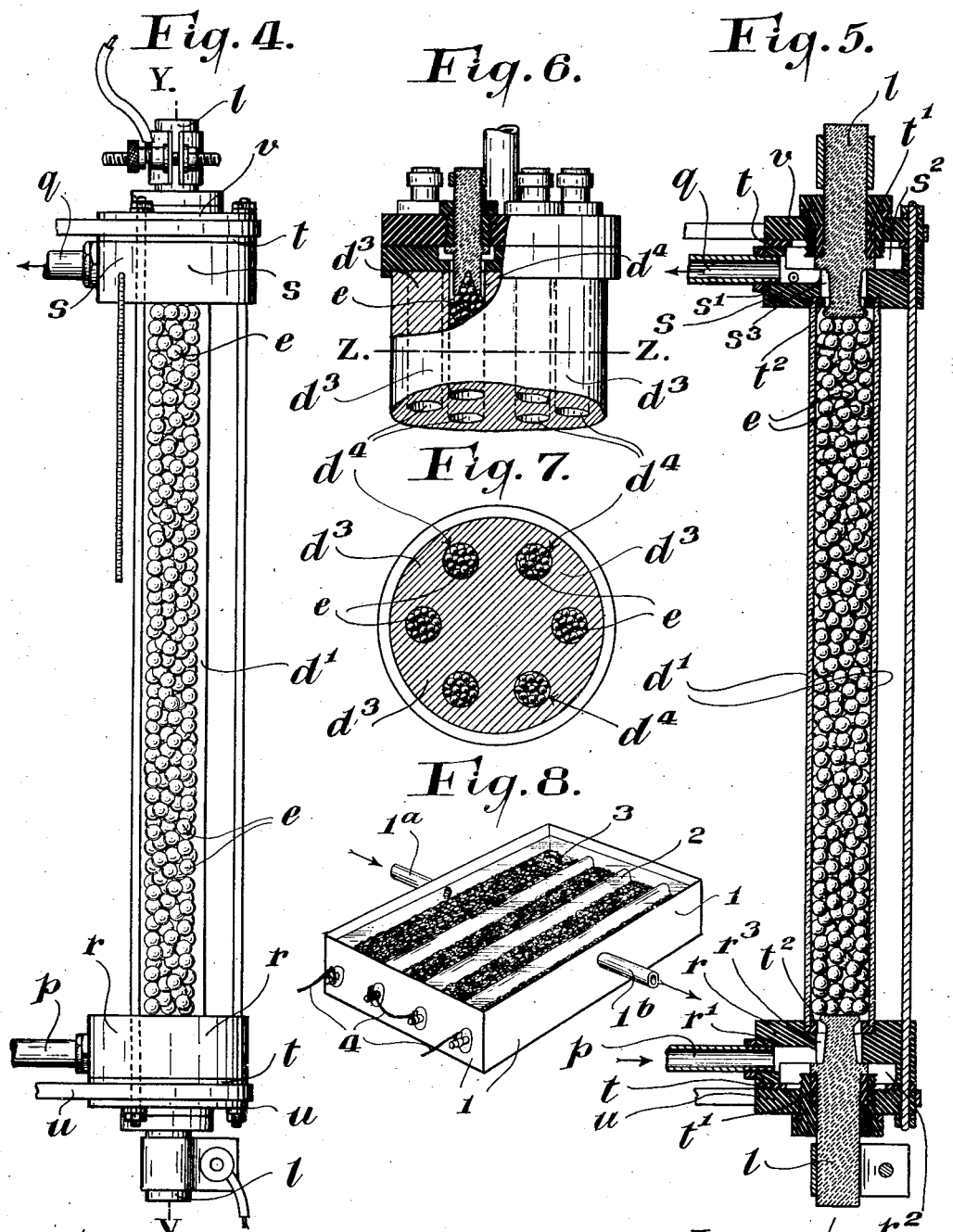

UNITED STATES PATENT OFFICE.

CHARLES KRATT, OF GLASGOW, SCOTLAND, ASSIGNOR TO THOMAS McCLELLAND, JR., OF MUIREND, CATHCART, NEAR GLASGOW, SCOTLAND.

APPARATUS FOR HEATING WATER BY ELECTRICITY.

1,001,654. Specification of Letters Patent. Patented Aug. 29, 1911.

Application filed October 10, 1910. Serial No. 586,134.

*To all whom it may concern:*

Be it known that I, CHARLES KRATT, a subject of the King of Great Britain, residing at Glasgow, Scotland, have invented a certain new and useful Apparatus for Heating Water by Electricity, of which the following is a specification.

This invention relates to an improved apparatus for heating water by electricity.

Under my invention the water to be heated is passed through one or more tubes or containers made of glass or other non-conducting material containing an electrical resistance consisting of a quantity of small pieces, particles, or granules of carbon (or other equivalent non-metallic resisting material) more or less loosely packed therein and an electric current is passed through the tube or container, the carbon (or other equivalent non-metallic resisting material) therein acting as the conductor. Owing to the high resistance of the carbon (or the like) it is quickly raised to a high temperature which is communicated to the water as it passes in contact with the same.

In carrying out my invention I, preferably, pass the water to be heated through one or more tubes or containers made of non-conducting material, each tube or container having a number of small pieces or particles of carbon packed therein and having means and connections at the ends thereof for passing an electric current, derived from any suitable source, from one end to the other thereof, the carbon acting as a conductor inside each tube or container, and, as the carbon presents a very high resistance to the passage of the electric current, it is very quickly heated to a high temperature with the result that the water which passes over the same, and which is finely broken up thereby, is brought into intimate contact with the heat radiating carbon particles and quickly raised to a correspondingly high temperature. Means may be provided for readily inserting fresh carbon when deemed necessary. A battery or series of the tubes or containers may be arranged and the water caused to circulate therethrough and to be heated therein, the heated water passing to one or more radiators of any suitable construction from which the heat is given off so as to heat a room or other interior. The heated water may be continuously drawn off for washing or cleansing purposes—the apparatus serving as a geyser. Water heated in this manner can be used for quite a number of other purposes than those mentioned and the containers can be made in a manner to suit the purposes to which the water is to be used. The containers may be made of various lengths and diameters and the resisting material may be simply packed in position or may be arranged on trays, or supports, or shelves, or otherwise, so as to present as large a surface as possible to the water. If so desired, the container or containers may be inclosed in a jacket or outer vessel through which water can be passed, either continuously, or intermittently in order to be heated, or, if preferred, air may be passed through the jacket in order to be heated. In some cases the jacket may have the air exhausted therefrom so as to act as a vacuum jacket or it may be packed with suitable material in order to conserve the heat of the container. The container may have, at each end thereof, a carbon or other disk to which the electric terminals are, or may be, connected, if desired.

In order that my invention may be clearly understood, I have hereunto appended explanatory sheets of drawings, whereon I have shown, by way of example, some forms of electric water heaters in accordance with my invention.

Figure 1 shows, partly in elevation and partly in sectional elevation, a heater comprising five tubes connected up to a water circulating tank. Fig. 2 is a plan of the heater shown in Fig. 1. Fig. 3 shows the upper part of the same heater, the section being taken on the line X—X, Fig. 2, and Fig. 3ª is a plan of the disk $f$. Fig. 4 shows a single tube heater in elevation. Fig. 5 shows the same heater in sectional elevation. Fig. 6 shows, partly in sectional elevation, a modified form of grouped heater. Fig. 7 is a sectional plan of the same on the line Z—Z, Fig. 6. Fig. 8 is an isometric view of a heater in the form of a trough or tray.

On the drawings the same reference letters, wherever repeated, indicate the same or similar parts.

Referring to Figs. 1 to 3 of the drawings:—$a$ designates a water circulating tank which may be of any desired size or shape and from this tank, pipes $b$ and $c$ lead respectively to the top and bottom of an electric heater $d$. The heater in this case consists of five open-ended glass tubes $d^1$ filled with carbon balls or granules $e$, and secured at top and bottom to vulcanite or ebonite or other suitable insulating disks $f$ and $g$ respectively. The disks $f$ and $g$ have annular recesses $f^1$ and $g^1$ respectively therein into which the open ends of the glass tubes $d^1$ project, and slots $f^2$ and $g^2$ lead from the said annular recesses $f^1$ and $g^1$ to the centers of the disks $f$ and $g$. Vulcanite, ebonite or other suitable insulating disks $h$ and $k$ are secured over the disks $f$ and $g$ respectively and they are made with central holes $h^1$ and $k^1$ adapted to receive the ends of the pipes $b$ and $c$ leading respectively to and from the tank $a$, the holes $h^1$ and $k^1$ being also adapted to register with the slots $f^2$ and $g^2$ leading to the annular recesses $f^1$ and $g^1$ in the disks $f$ and $g$. Contact plugs $l$ are provided and passed through insulating bushes $m$ secured in screw-threaded holes $h^2$ and $k^2$ in the disks $h$ and $k$. The plugs $l$, which project outward from the bushes $m$, are preferably made of carbon and cylindrical in shape with a flange at $l^1$ and a reduced end $l^2$ adapted to make contact with the carbon balls or granules $e$, as shown at Fig. 3, and they are of such size and shape as to leave an annular space between the exterior of the reduced end $l^2$ and the interior of the tube $d^1$ so that water can pass from the annular recesses $f^1$ and $g^1$ to the tubes $d^1$. Terminal clips $o$ are secured on the outer projecting ends of the contact plugs $l$ and wires or leads from any suitable source of electric supply are secured thereto, either in series, in parallel, or, if desired, some of the tubes may be connected up in series and some in parallel. A suitable switch or switches would, of course, be provided for controlling the electricity supply. The arrangement is such that, when an electric current is passed through the leads or wires connected up to the contact plugs $l$ at one end of the heater, it is conducted therefrom the plugs $l$ at the other end thereof though the carbon balls or granules $e$ which, owing to their resistance to the passage of the current, are raised to a high temperature and the water from the tank $a$, which circulates through the tubes $d^1$ and which is finely broken up by the balls or granules $e$ therein, is raised to a corresponding temperature by contact with the heated carbon. Cold water from the tank $a$ enters the heater $d$ by the pipe $c$ at the bottom and the hot water passes from the top of the heater $d$ by the pipe $b$ into the top of the tank from which it may be drawn off, or otherwise utilized in any usual manner. $a^1$ is the cold water inlet to the tank and $a^2$ the hot water outlet or draw-off pipe.

As shown in Figs. 6 and 7, the heater may consist of a porcelain or other di-electric block $d^3$ having a number of holes $d^4$ therein which are filled with the carbon balls or granules $e$, the end connections being the same, or nearly the same, as in the heater shown at Figs. 1 to 3.

A single tube heater is shown at Figs. 4 and 5. This heater is constructed on similar lines to the five tube heater shown in Figs. 1 to 3, but, in this case, the tube $d^1$ is centrally placed with regard to the disks $r$ and $s$, and the ends of the water inlet pipe $p$ and of the outlet pipe $q$ are inserted and screwed or otherwise secured in holes $r^1$ and $s^1$ in the sides of the disks $r$ and $s$ respectively. The disks $r$ and $s$ are also made with central holes $r^3$ and $s^3$ through which the ends of the carbon contact plugs $l$ pass. In order to permit of expansion and contraction of the materials used in the construction of the heater, due to their being subjected to great changes in temperature, I provide elastic rings $t$ between the disk $r$ and the outer disk $u$ and between the disk $s$ and the outer disk $v$, and elastic rings or sleeves $t^1$ are also provided between the contact plugs $l$ and the insulating bushes $m$ which are each made with an annular recess for the purpose of receiving the ring or sleeve $t^1$. The ends of the tube $d^1$ are also bedded on elastic rings $t^2$ to allow for expansion. A thermometer may, if desired, be fitted on the heater and in communication with the annular recess $s^2$ of the disk $s$ for the purpose of indicating the temperature of the water.

In cases where it is desired to present a large heating surface to the water, a trough or tray heater or container such as shown in Fig. 8 may be used. The heater in this case may consist of a porcelain or other di-electric trough 1 having a corrugated bottom 2, and, in the hollows of the corrugations, a quantity of carbon particles or granules 3. The carbon in each hollow is laid therein so as to give continuous electrical connection from end to end and contact plugs 4 with wiring in series or otherwise pass through the sides of the trough and make contact with the carbon particles 3. $1^a$ is the water inlet and $1^b$ the water outlet. Preferably, as shown in Fig. 8, the water is caused to flow transversely over the corrugations in the bottom of the trough 1.

In my apparatus the arrangement is such that in no case does the water come in contact with a metallic surface.

In cases where the heater is adapted to generate steam a safety valve may be fitted on it.

Having now fully described my invention what I claim and desire to secure by Letters Patent is:—

1. An apparatus for heating water by electricity comprising a container of non-conducting material, pieces of non-metallic resisting material in the container, means for passing water in contact with the resisting material and carbon plugs in the container, said plugs being in contact with the resisting material.

2. An apparatus for heating water by electricity comprising a tubular container of non-conducting material, pieces of non-metallic resisting material in the container, means for passing water in contact with the resisting material, a carbon plug in each end of the tubular container and means whereby an electric current can be passed through said material.

3. An apparatus for heating water by electricity comprising a tubular container of non-conducting material, pieces of non-metallic resisting material in the container, means for passing water in contact with the resisting material, a cylindrical carbon plug in each end of the tubular container and means whereby an electric current can be passed through said material.

4. An apparatus for heating water by electricity comprising a tubular container of non-conducting material, pieces of non-metallic resisting material in the container, means for passing water in contact with the resisting material, a cylindrical carbon plug with reduced extension in each end of the tubular container and means whereby an electric current can be passed through said material.

5. An apparatus for heating water by electricity comprising a tubular container of non-conducting material, pieces of non-metallic resisting material in the container, means for passing water in contact with the resisting material, a cylindrical carbon plug with reduced extension and external flange thereon in each end of the tubular container and means whereby an electric current can be passed through said material.

6. An apparatus for heating water by electricity comprising a tubular container of non-conducting material, a disk at the upper end of the container, a disk at the lower end of the container each disk having a water passage therein, a carbon plug in each disk, pieces of non-metallic resisting material in the container, means for passing water in contact with the resisting material and through said disks.

7. An apparatus for heating water by electricity comprising a tubular container of non-conducting material, a disk at the upper end of the container, a disk at the lower end of the container each disk having a water passage therein, a cylindrical carbon plug in each disk, pieces of non-metallic resisting material in the container, means for passing water in contact with the resisting material and through said disks.

8. An apparatus for heating water by electricity comprising a tubular container of non-conducting material, an insulating disk at the upper end of the container, an insulating disk at the lower end of the container each disk having a water passage therein, a carbon plug in each disk, pieces of non-metallic resisting material in the container, means for passing water in contact with the resisting material and through said disks.

9. An apparatus for heating water by electricity comprising a tubular container of non-conducting material, a disk at the upper end of the container, a disk at the lower end of the container each disk having a water passage therein, disks covering the said water passages and secured to the disks at each end of the container, a carbon plug projecting through the disks at each end of the container, pieces of non-metallic resisting material in the container, means for passing water in contact with the resisting material.

10. An apparatus for heating water by electricity comprising a tubular container of non-conducting material, pieces of non-metallic resisting material in the container, an insulating disk at the upper end of the container, an insulating disk at the lower end of the container each disk having a water passage therein, a carbon plug removably secured in each disk, means for passing water in contact with the resisting material and through said disks and around said plugs.

11. An apparatus for heating water by electricity comprising a plurality of tubular containers of non-conducting material, an insulating disk at the upper ends of the containers, an insulating disk at the lower ends of the containers said disks having water passages therein communicating with the containers, granules of non-metallic resisting material in the containers, means for passing water in contact with the resisting material and means whereby an electric current can be passed through said material.

12. An apparatus for heating water by electricity comprising a plurality of tubular containers of non-conducting material, an insulating disk at the upper ends of the containers, an insulating disk at the lower ends of the containers said disks retaining the containers in position having water passages therein communicating with the containers, granules of non-metallic resisting material in the containers, means for passing water in contact with the resisting material and means whereby an electric current can be passed through said material.

13. An apparatus for heating water by electricity comprising a plurality of tubular containers of non-conducting material, an insulating disk at the upper ends of the containers, an insulating disk at the lower ends of the containers said disks having water passages therein communicating with the containers, means for binding the disks together, granules of non-metallic resisting material in the containers, means for passing water in contact with the resisting material and means whereby an electric current can be passed through said material.

14. An apparatus for heating water by electricity comprising a plurality of tubular containers of non-conducting material, an insulating disk at the upper ends of the containers, an insulating disk at the lower ends of the containers said disks having water passages therein communicating with the containers, a plurality of carbon plugs one for each end of each container, granules of non-metallic resisting material in the containers, means for passing water in contact with the resisting material and means whereby an electric current can be passed through said material.

15. An apparatus for heating water by electricity comprising a plurality of tubular containers of non-conducting material, an insulating disk at the upper ends of the containers, an insulating disk at the lower ends of the containers said disks retaining the containers in position having circular water passages therein communicating with the containers, granules of non-metallic resisting material in the containers, means for passing water in contact with the resisting material and means whereby an electric current can be passed through said material.

16. An apparatus for heating water by electricity comprising a tubular container of non-conducting material, a disk at the upper end of the container, a disk at the lower end of the container each disk having a circular water passage therein, a carbon plug in each disk, pieces of non-metallic resisting material in the container, means for passing water in contact with the resisting material and through said disks.

17. An apparatus for heating water by electricity comprising a tubular container of non-conducting material, a disk at the upper end of the container, a disk at the lower end of the container each disk having a water passage therein, a carbon plug centrally in each disk, pieces of non-metallic resisting material in the container, means for passing water in contact with the resisting material and through said disks.

18. An apparatus for heating water by electricity comprising a tubular container of non-conducting material, a disk at the upper end of the container, a disk at the lower end of the container each disk having a water passage therein, a carbon plug in each disk and projecting through the same into contact with the resisting material, pieces of non-metallic resisting material in the container, means for passing water in contact with the resisting material and through said disks.

19. An apparatus for heating water by electricity comprising a tubular container of non-conducting material, a disk at the upper end of the container, a disk at the lower end of the container each disk having a water passage therein, a carbon plug in each disk and projecting through the same into contact with and pressing on the resisting material, pieces of non-metallic resisting material in the container, means for passing water in contact with the resisting material and through said disks.

20. An apparatus for heating water by electricity comprising a tubular container of non-conducting material, a disk at the upper end of the container, a disk at the lower end of the container each disk having a water passage therein, a carbon plug in each disk, pieces of non-metallic resisting material in the container, means for passing water in contact with the resisting material and through said disks and also in contact with the carbon plugs so as to wash the same.

21. An apparatus for heating water by electricity comprising, a tubular container of non-conducting material, pieces of non-metallic resisting material in the container, an insulating disk at the upper end of the container, an insulating disk at the lower end of the container each disk having a water passage therein leading to the interior of the container, a carbon plug removably secured in each disk and projecting through the water passage thereof into the container and pressing on the resisting material, means for passing water in contact with the resisting material and through said disks and around said plugs.

In testimony whereof I affix my signature in presence of two witnesses.

CHARLES KRATT.

Witnesses:
HUGH D. FITZPATRICK,
GEORGE WOLFE BRUCE.